Sept. 1, 1964   P. GHISONI   3,146,655
AUTOMATIC MACHINE FOR CUTTING ROLLS OF TOILET PAPER
Filed June 5, 1961
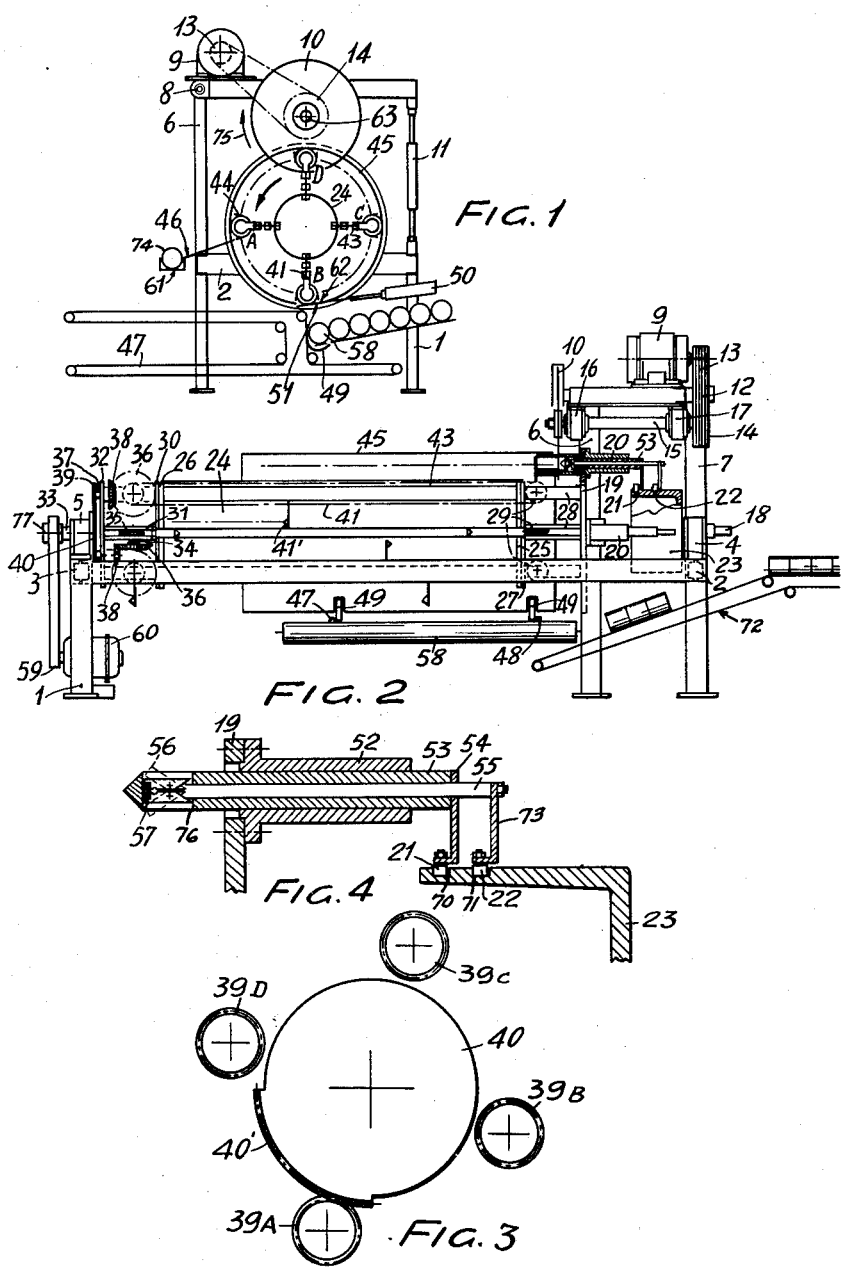
INVENTOR
PIETRO GHISONI
BY Irwin S. Thompson
ATTORNEY ର
United States Patent Office 3,146,655
Patented Sept. 1, 1964

3,146,655
AUTOMATIC MACHINE FOR CUTTING ROLLS OF TOILET PAPER
Pietro Ghisoni, Cairate, Italy, assignor to Cartiera di Cairate S.p.A., Milan, Italy
Filed June 5, 1961, Ser. No. 129,920
Claims priority, application, Italy, June 9, 1960, Patent 632,027
4 Claims. (Cl. 83—411)

This invention relates to an automatic machine used to cut rolls of material such as toilet paper using a circular saw or band saw.

It is known that rolls having a length which is some multiple of the length of the individual, such as finished toilet paper rolls, are delivered from endless toilet paper making machines, said rolls then being loaded on rewinders which rewind it on a cardboard tube of predetermined dimensions. These rolls of paper will henceforth be called spools in order to distinguish them from the individual finished rolls and these spools must then to cut into rolls having predetermined dimensions.

This invention has solved the problem of cutting the spools into a number of rolls automatically and continuously by means of a saw, and to this end, a machine has been built which consists generally of a supporting frame for the entire unit, a rotating saw blade which does the cutting, a spool-holding unit which serves to convey the spools towards the saw, a mechanical control system to feed the cutting blade and to deliver the rolls and a feeder to supply the machine with new spools.

The accompanying drawing illustrates a schematic drawing of one form of embodiment of such an automatic machine as a non-restrictive example embodying this invention, wherein:

FIG. 1 is a horizontal cross section of an automatic machine for cutting rolls of toilet paper, perpendicular to the axis of the saw and to the axis of the spools.

FIG. 2 is a longitudinal section of the automatic machine shown in FIG. 1.

FIG. 3 is a schematic representation of the spool feed showing spool positions and associated spur gears, and FIG. 4 is a detailed cross section of the reciprocable spindle shown in FIG. 2.

The two bearings 4 and 5 which support the rotating mechanism rest on cross members 2 and 3 (FIG. 2), while uprights 6 and 7 carry pivot 8 (FIG. 1) about which the supporting frame of motor 9 and blade 10 are free to rotate. The rotation of the frame which carries the cutting unit is controlled by rod 11. By adjusting this rod or turnbuckle, the blade can be lowered to the right cutting position in relation to the diameter of the blade itself and the diameter of the spools to be cut. The operation can be performed while the machine is running. The motion of the blade is transmitted to it through V-belts 12 which run in two grooved pulleys, one 13 being mounted on the shaft of the motor 9 and the other 14 being mounted on the shaft 15 which carries the blade 10 overhanging one end. This shaft is supported by two bearings 16 and 17 whch are bolted to the frame.

A shaft 18 (FIG. 2) carried by supporting bearing 4 is welded to the center of a flange 19 which carries four spindles 20 which are 90° from one another, the function of which will be described further on. These spindles are controlled through two follower cams 21 and 22 which operate inside grooves 70 and 71 provided for them and suitably shaped in the outer surface of a cylindrical body 23 fixed to the frame. A centrally located tube or pipe 24 carries two flanges 25 and 26 welded at its ends. Flange 25 is bolted to a second flange 27 which has, welded to its face opposite that at which flange 25 is in contact, four pairs of strap iron members 28 (FIG. 2) welded at their opposite ends to flange 19.

Each pair of strap iron members 28 contains the seats for two bearings built into them, said bearings serving as supports for a shaft which is rigidly fixed to a sprocket 29. Flange 26 is bolted to a flange 30, which like flange 27 carries four pairs of strap iron members 31, placed in line with the pairs of strap iron members 28. These strap iron members 31 at the opposite end are welded to a flange 32 which carries shaft 33 welded to its center, shaft 33 being mounted in bearing 5. Each pair of strap iron members 31 has a seat built into it for two bearings which provide support for a shaft 34 which has rigidly connected to it a sprocket 35 located between two strap iron members 31 and a bevel gear 36 on the outside of the latter. Flange 32 has four holes, 90° from one another. In each of these holes a seat is provided for a bearing which serves to support a shaft 37, which carries at one end a beveled pinion 38 which meshes with gear 36 and at the other end a spur gear 39 which operates together with a wheel 40 carrying a toothed sector 40' better shown in FIG. 3 and whose function will be described further on. Wheel 40 is fixed to the frame of the machine. The two sets of gears 29 and 35 carry a chain 41 to which are rigidly connected two bearers 41'. The length of chain 41 which moves furtherest outside in respect to cylinder 24 travels inside guides 43 fixed to flanges 25 and 26 while the return length passes inside cylinder 24. Naturally, flanges 25 and 26 are provided with suitable milling allowing the chains and bearers to pass therethrough. Cylindrical containers 44, disposed in two halves to allow the bearers to pass through, are fixed to the chain guides 43, said containers being adjustable to suit the diameters of the spools 58 to be cut.

A protective shield 45 prevents the spools 58 from coming out of the containers while rotating. Said shield 45, having an opening at the feed end, is fixed to the frame. A transfer member 46 also fixed to the frame provides for removal of the rolls 74 which have been cut and conveys them to a chute 61 then to a conveyor belt 72.

The feeder of the spools 58 to be cut is composed of two chains 47 and 48 (FIG. 1). A feeder hook 49 is fixed to each of these two chains, said feeder hooks doing the feeding. The feeder hooks 49, as seen in FIG. 1, are so constructed that the surfaces of the spools 58 are sufficiently exposed. The speed of travel of the chains 47 and 48 is substantially slower than the rotation of the containers 44 which thereby allows removal of the spool 58 without interference with the rotating shield 45. The chains are of such length as will allow the hooks 49 to be in the same position again from which they started after 3¼ turns of cylindrical body 23 which in the case being presently considered constitutes taking a spool 58 having the length for 14 rolls and thereby requiring 13 cuts to obtain same. Naturally the motion of chains 47 and 48 is timed to that of the rotating saw, so that hooks 49 will always find themselves in position to feed when one of the containers 44 is lined up with the feed opening 62. A pneumatic control placed in shield 45 operates driving piston 50 causing sheet 51 to retract leaving the feed opening 62 open.

As soon as the spool 58, brought into the proper position by hooks 49, has entered container 44, sheet 51 is closed by piston 50.

The reciprocable spindle 20 (FIG. 2) is better shown in FIG. 4, and includes an outer jacket 52 fixed to flange 19. A cylindrical member 53 slides inside jacket 52 and has one end tapered, while its other end is fixed to a bracket 54 which carries a follower cam 21. This follower cam runs inside a groove 70 in the outer surface of cylindrical body 23 and controls the motion of member 53. The inside of member 53 is hollow and inside it a rod 55 is free to move. Rod 55 has one end connected to follower cam 22 through bracket 73. Follower cam 22 is disposed inside groove 71 in the outer surface of cylindrical body 23. The rod 55 has an end which tapers to a point. At the tapered end of member 53 four segments 56 are housed in openings 76 and are pivoted on the walls of member 53. The segments 56 are able to assume two different positions: the first (shown in FIG. 4) as solid lines, when the rod 55 is in an advanced position with respect to member 53, the second (shown as dotted lines) into which position the segments are brought by the action of springs 57 which were compressed in the previous position, when the rod 55 is in a retracted position with respect to member 53.

The unit comprising the mmeber 53 and rod 55 can take on different positions with respect to flange 19 as a function of the outline of grooves 70 and 71 in cylindrical body 23.

The feed of the spools 58 underneath the cutting action performed by saw 10 is provided by a system represented schematically in FIG. 3 on an enlarged scale. A spur gear 39 is located at each set of bevel gears comprising gears 36 and 38, spur gear 39 being mounted on the same shaft which carries pinion 38. In all, the gears 39A, 39B, 39C, 39D are disposed at four positions located at 90° from one another, due to there being four spool carrying positions. The gears 39A to 39D rotate about an axis parallel to the central axis 63 of the saw 10 and when they meet the toothed sector 40' of fixed wheel 40, they make one complete revolution about their own axis. By selecting a suitable bevel-gear ratio, the number of teeth for sprocket 35 and the pitch of chain 41, different rates of feed can be obtained, which feeds, however, will remain constant during each turn of the saw.

The machine described herein operates as follows:

The example given is in reference to a spool 58 to be cut into 14 rolls.

It will be assumed, for simplicity of description, that the saw is made to start under no-load conditions and that the feeders are in loading position. Upon starting up the machine, the spool carrying stations, indicated by A, B, C and D (FIG. 1) will be in the position shown therein. The saw turns in the direction indicated by the arrow 75. Given the timing between the rotating containers and the feeders, when station B arrives at a position in front of opening 62 in the shield 45, hooks 49 will be in such a position so as to deposit a spool 58 inside the container 44 at station B.

Naturally, the hooks 49 will have caused sheet 51 to shift position, through action upon an electrical contact (not shown) a short time beforehand, closing said contact, thereby resulting in the actuation of an air chamber causing piston 50 to operate. As soon as the spool is loaded, sheet 51 closes again and remains closed until the next operation. As can be seen from FIG. 2, spool 58 as soon as it enters the container 44, is separated from flange 19. About 1/8 of a turn before the spool is fed to the saw, toothed wheel 39A meshes with the toothed sector 40' on fixed wheel 40 and, by way of pinion 38, beveled gear 39 and sprocket 35, brings about the advancement of bearer 41' fixed to chain 41 which carries the spool against flange 19. At this point member 53 (FIG. 4), which, at its inoperative position is entirely on one side of flange 19, now extends on the other side of flange 19 due to the effect of follower cam 21 and enters into the tube at the core of the spool. In the meantime, rod 55 through the action of follower cam 22 retracts with respect to member 53, whereupon the segments 56, due to the effect of springs 57, expand (moving out of member 53 through milled openings 76 provided for them) and, operating on the inside of the tube at the core of the spool, lock the spool in this position. Thus the spool is brought into contact with the saw blade which cuts off the first roll. The spindle 20, expanded on the inside of the cut roll prevents the tubular core of the roll from being crushed or distorted and prevents all motion of the roll during the cutting operation.

As soon as the cut is complete, rod 55 shifts within and in relation to member 53 and, bringing the tapered part of its end up against the ends of segments 56, it forces them to be reseated in openings 76, thereby compressing the springs 57. Then both the member 53 and the rod 55 retract to the same extent, in such a way that the tapered point at the end of member 53 is brought back even with flange 19. The cut roll 74 is no longer sustained by spindle 20 thereby dropping onto the transfer member 46 between the shield 45 and the flange 19, as seen in FIG. 1. When the roll 74 comes into contact with the transfer member 46, it has already been severed from the spool. Since the member 53 has already withdrawn, the roll 74 comes in contact with transfer member 46 (FIG. 1), ending up in the chute 61 which carries it to conveyor belt 72 and then to the wrapping machinery. The transfer member 46, if seen in FIG. 2, would be on the right side of the blade 10, having a width corresponding to the longitudinal length of the roll 74. Since the containers 44 are on the left side of the blade 10 and cannot engage the transfer member 46, that part of the spool remaining in the container is not engaged by the transfer member 46. During this first part of the process the chains 41 of containers 44 for positions B, C and D, will have also been advanced and the spools 58 therein will each have gone through a complete cycle in the manner hereinabove described. As more fully described below, when the last roll 74 is discharged from the container, the bearer 41' moves to its return section inside pipe 24.

During successive rotations of the spool-holding unit, the above described operation will be repeated. After 3¼ rotations of cylindrical body 23 from the feeding of container B, container A will be fed and after another 3¼ turns of cylindrical body 23 container D will be fed, after which upon another 3¼ turns of cylindrical body, C will be fed again. When another 3¼ turns of cylindrical body 23 have occurred from the feeding of C, that is, after 13 cutting operations, container B will be refed. Naturally, upon completion of the thirteenth cut, only one of the two remaining rolls 74 is discharged onto the transfer member 46, i.e., the roll 74 on the right side of the blade 10, as seen in FIG. 2. The roll on the left side of the blade is removed through the portion AB of the sleeve since the container opens for receiving a new spool at B. This last roll falls into a separate container (not shown).

A grooved pulley 77 is mounted on shaft 33, said pulley receiving its drive from another pulley 59 mounted, in turn, on the motor shaft of motor 60.

The chute 61 which conveys the cut rolls to conveyor 72 and then to the wrapping machine is also made to operate through V-belts driven by the main drive motor 60.

I claim:

1. A machine for automatically feeding and cutting spools of material in a continuous operation into rolls of material of predetermined length comprising a frame, a rotating saw mounted on said frame, means to rotate said saw, a rotatable spool-holding unit mounted on said frame having at least two containers disposed thereon to receive within each container a spool of material to be cut, means mounted on said spool-holding unit and disposed within each container for advancing said spool of material so as to be cut into rolls of material of predetermined length by said saw, means operatively connected to said advancing means to operate same, reciprocating spindle means disposed opposite said containers to enter said spool of material and maintain same to prevent any substantial movement while said spool of material is being cut, means operatively connected to said spindle means to automatically reciprocate same so as to enter and be removed from said spool of material while being cut into rolls, and feeder means disposed adjacent said spool-holding unit to feed spools of material into said containers when said containers pass thereby, said spool-holding unit further comprising a centrally disposed tube, first flanges mounted on each end of said tube, said containers being mounted on said flanges parallel to said tube, a second flange disposed from the first flange at each end of said tube, and bracket means mounted between each first flange and second flange, said advancing means including sprocket gear means disposed on said bracket means which bracket means being mounted adjacent the ends of each container, endless chain means mounted on said sprocket gear means so that a portion of said endless chain means moves within said container and another portion thereof moves within said tube, bearer members mounted on said endless chain means to bear against the spool of material in said container to urge same into position to be cut by said saw, said operating means to operate said advancing means including gear means connected to the sprocket gear means remote from said saw, a wheel having a toothed sector fixed on said frame adjacent said gear means, each gear means for each sprocket gear means engaging said toothed sector as said spool-holding unit rotates to drive said gear means, sprocket gear means and endless chain means.

2. A machine according to claim 1 in which said spindle means includes a hollow cylindrical member mounted on said spool-holding unit adjacent said saw, a rod disposed in said hollow cylindrical member, segments pivotally mounted in one end of said cylindrical member which have a portion that extends outside of said cylindrical member when in an operating position, biasing means connected to said segments to maintain same within said cylindrical member when in an inoperative position, said cylindrical member and said rod movable relative to each other, and said rod engaging said segments to place same in said operating position.

3. A machine according to claim 2 in which said means to automatically reciprocate said spindle means includes a cylindrical body mounted on said frame adjacent said spindle means, groove means disposed in the surface of said cylindrical body, follower cams disposed within said groove means, and means connecting said follower cams to said cylindrical member and rod to move same relative to each other in accordance with the movement of the follower cams within said groove means.

4. A machine according to claim 1 in which a protective shield surrounds said spool-holding unit to prevent the spools of material in said containers from coming out while said spool-holding unit is rotating, and means disposed in said protective shield adjacent said feeder means to permit said feeder means to feed spools of material in said containers.

References Cited in the file of this patent

UNITED STATES PATENTS

| | | |
|---|---|---|
| 1,289,388 | Calleson | Dec. 31, 1918 |
| 1,913,291 | Rountree | June 6, 1933 |
| 2,101,654 | Sheehan | Dec. 7, 1937 |
| 2,123,580 | Wheless | July 12, 1938 |
| 2,273,982 | Ostas | Feb. 24, 1942 |
| 2,321,735 | Clifford | June 15, 1943 |
| 2,810,438 | Stone | Oct. 22, 1957 |
| 2,884,066 | Teplitz | Apr. 28, 1959 |
| 3,067,644 | Dearsley | Dec. 11, 1962 |